US006226530B1

(12) United States Patent
Barakat et al.

(10) Patent No.: US 6,226,530 B1
(45) Date of Patent: May 1, 2001

(54) METHOD OF DETECTING FRAUD CONCERNING ELECTRONIC MEMORY CARDS USED IN TELEPHONY

(75) Inventors: Simon Barakat, Saint Germain les Arpajon; Charles Cavailles, Chatillon, both of (FR)

(73) Assignee: Schlumberger Systemes, Montrouge (FR)

(*) Notice: Subject to any disclaimer, the term of this patent is extended or adjusted under 35 U.S.C. 154(b) by 0 days.

(21) Appl. No.: 09/506,243

(22) Filed: Feb. 17, 2000

Related U.S. Application Data

(63) Continuation of application No. PCT/FR98/01811, filed on Aug. 14, 1998.

(30) Foreign Application Priority Data

Aug. 20, 1997 (FR) .................................................. 97 10510

(51) Int. Cl.[7] ...................................................... H04B 1/38

(52) U.S. Cl. .......................... 455/558; 455/410; 455/411; 379/144; 379/145; 379/357; 235/380; 235/451

(58) Field of Search .................................... 379/144, 145, 379/357; 455/410, 411, 558; 235/380, 375, 382, 451, 492

(56) References Cited

U.S. PATENT DOCUMENTS

| | | | | |
|---|---|---|---|---|
| 4,910,774 | * | 3/1990 | Barakat | 705/67 |
| 5,122,646 | * | 6/1992 | Taeymans et al. | 235/492 |
| 5,416,423 | * | 5/1995 | De Borde | 324/677 |
| 5,434,387 | * | 7/1995 | Diehl et al. | 235/380 |
| 5,478,996 | * | 12/1995 | Muto et al. | 235/441 |
| 5,510,720 | * | 4/1996 | Vauclin | 324/652 |
| 5,923,191 | * | 7/1999 | Nemetz et al. | 327/20 |
| 5,945,662 | * | 8/1999 | Vallat | 235/492 |

FOREIGN PATENT DOCUMENTS

| | | |
|---|---|---|
| 682 520 | 9/1993 | (CH) . |
| 0 619 560 | 10/1994 | (EP) . |
| 2 640 061 | 6/1990 | (FR) . |

* cited by examiner

*Primary Examiner*—Curtis Kuntz
*Assistant Examiner*—Barry W Taylor
(74) *Attorney, Agent, or Firm*—Frishauf, Holtz, Goodman, Langer & Chick, P.C.

(57) ABSTRACT

Detecting fraud involving an electronic memory card having a given operating frequency (F0) and used in a telephone set. An excitation signal (si) of variable frequency is applied to the card, and a response pattern (M) produced by the card responsive to a low frequency excitation is recorded. A determination is made that fraud is taking place when the response pattern becomes distorted at an excitation frequency that is lower than the operating frequency (F0) of the card.

5 Claims, 2 Drawing Sheets

METHOD OF DETECTING FRAUD CONCERNING ELECTRONIC MEMORY CARDS USED IN TELEPHONY

This application is a continuation of PCT/FR98/01811 filed Aug. 14, 1998.

FIELD OF THE INVENTION

The present invention relates to a method of detecting fraud involving an electronic memory card of given operating frequency used in a telephone set.

A particularly advantageous application of the invention lies in combatting fraudulent calls set up from a telephone set, particularly but not exclusively a public telephone set.

BACKGROUND OF THE INVENTION

Descriptions of memory card technology in popular electronic journals, and in technical training establishments, have greatly contributed to attempts at making fraudulent use of telephone sets by emulating electronic memory cards or "phone cards" designed to operate with such telephone sets. Furthermore, the widespread commercial availability of highly technical components, such as programmed microprocessors, and the ease with which they can be used as acquired in school laboratories or from the programmers of microprocessors, means that this type of fraud can be expected to increase.

There exist two broad categories of phone card simulators, namely:

- wired 1 gic simulators known as "passive" simulators which imitate a phone card by connecting together discrete components; and
- programmed logic simulators, known as "active" simulators, which are devices essentially comprising a programmed microcontroller associated with a few passive components (resistors, capacitors). By means of an internal program, the microcontroller simulates the behavior of a phone card. Components of that type are now widely available on the non-professional market, as are tools for programming and development, in particular in the form of software running on personal computers.

In general, phone card fraud consists in connecting the active or passive simulator to the electrical contact zones of the electronic module of the card via connection wires, so as to connect the electronic simulator to the telephone set. In order to detect that type of fraud, the telephone set is provided with a specific device known as an external connection detector (ECD). The detector device is mainly constituted by a large and plane electrode suitable for overlaying the connection wires connecting the simulator to the contact zones. When there are no fraudulent connection wires, the only electrical capacitance present between the card and said electrode is a capacitance C0 due to the environment of the card and the electronics. However, the presence of fraudulent connection wires creates a distributed capacitance C1 between the plane electrode and the contacts of the pay phone terminal. An ECD is thus based on the principle of detecting an increase in capacitance from C0 to C0+C1 when a phone card is inserted having connection wires fitted thereto and leading to a simulator.

ECD detection suffers from the drawback that the extra capacitance C1 drifts with temperature and humidity, which means that in order to obtain best performance in terms of number of wires to be detected, it must have automatic correction based on hardware or semi-automatic correction based on software. It is then advantageous to make use of a differential circuit so as to cancel out the effects of the drift in the extra capacitance.

SUMMARY OF THE INVENTION

Specifically for the purpose of avoiding the above-specified drawback, the present invention provides a method of detecting fraud concerning an electronic memory card having a given operating frequency and used in a telephone set. The invention applies an excitation signal of variable frequency to said card, records a response pattern supplied by the card at a low excitation frequency, and determines that fraud is taking place in the event of said response pattern being deformed at an excitation frequency that is lower than the operating frequency of the card.

As explained in greater detail below, the method of the invention makes it possible to detect the fraudulent presence of an active phone card simulator by making use of the fact that simulation of a phone card by programmed logic can be done only on the basis of a microcontroller together with a programmed algorithm which can operate correctly only up to a maximum frequency Fs which depends on the clock specific to the microcontroller and on the number of cycles required to enable the algorithm to operate, whereas the operating frequency of a phone card depends solely on the technological characteristics of the component. Generally, for the widely available microcontrollers that might be used for fraudulent purposes, this maximum frequency Fs is well below that of an authentic component.

If no deformation of the response pattern is observed at a frequency lower than the operating frequency of the card, it can only be deduced that there is no active simulator based on a microcontroller, which does not mean, however, that there is no simulator at all, since a passive simulator based on wired logic behaves exactly like an authentic phone card in response to the excitation signal delivered by the pay phone.

In order to detect the presence of such a passive simulator, the invention performs an impossible write operation and then reads back that bit. A determination is made that fraud is taking place when the read-back is successful. Only fraudulent phone cards are capable of writing to memory under write conditions that are impossible for authentic cards.

Similarly, still for the purpose of detecting passive simulators, the invention applies an additional step of performing a memory read operation on a number of bits greater than the number of bits in the memory. With an authentic card, above the number of bits in the memory, addressing restarts from zero and bits are read back starting again from the first bit, whereas reading from a fraudulent card will be undefined.

BRIEF DESCRIPTION OF THE DRAWINGS

The following description with reference to the accompanying drawings which are given as non-limiting examples, explains the invention and how it can be implemented.

DETAILED DESCRIPTION OF THE PREFERRED EMBODIMENT

Figure 1A:
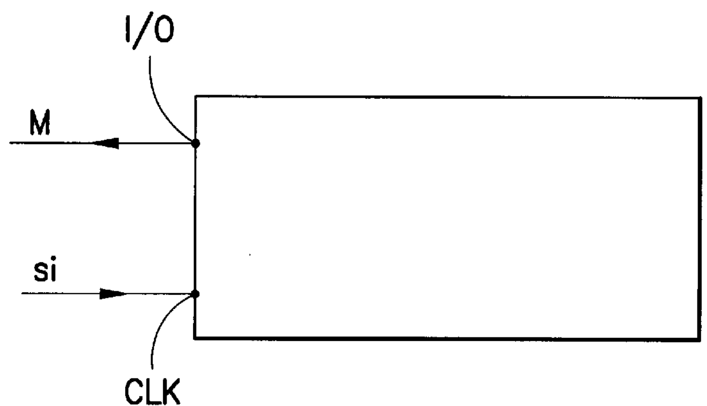
FIG. 1*a* is a diagram of a device for detecting an active simulator of an electronic memory card.

FIG. 1*a* shows a card that is designed to be used in a telephone set, such as a pay phone, for example. Said card may either be authentic or it may be fraudulent.

If it is authentic, it will be a phone card having a single electronic memory with an operating frequency F0 that is relatively high, 250 kHz or higher, since it depends only on the technological characteristics of the component, which component therefore behaves like a wired logic circuit.

If the card is fraudulent, in the form of a programmed logic simulator having a microcontroller applying a programmed algorithm, then the algorithm can be run correctly only at frequencies lower than a maximum frequency Fs determined by the clock belonging to the microcontroller and by the number of cycles required to run the algorithm. In general the maximum frequency Fs at which commercially-available microcontrollers operate (200 kHz) is less than the frequency F0 at which an authentic card operates.

Figure 1B:
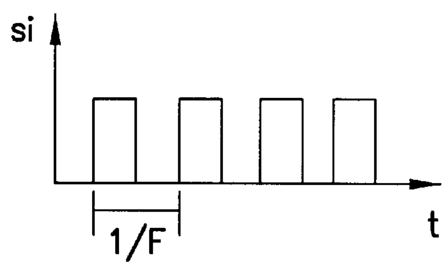
FIG. 1*b* is a waveform diagram of an excitation signal delivered by the FIG. 1*a* fraud detection device.
Figure 1C:
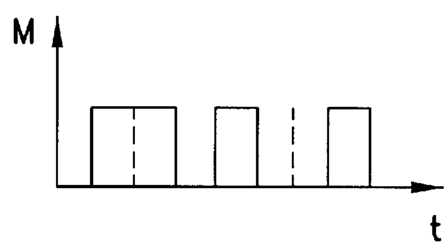
FIG. 1*c* is a diagram of a pattern supplied in response to the excitation signal of FIG. 1*b*.
Figure 3:
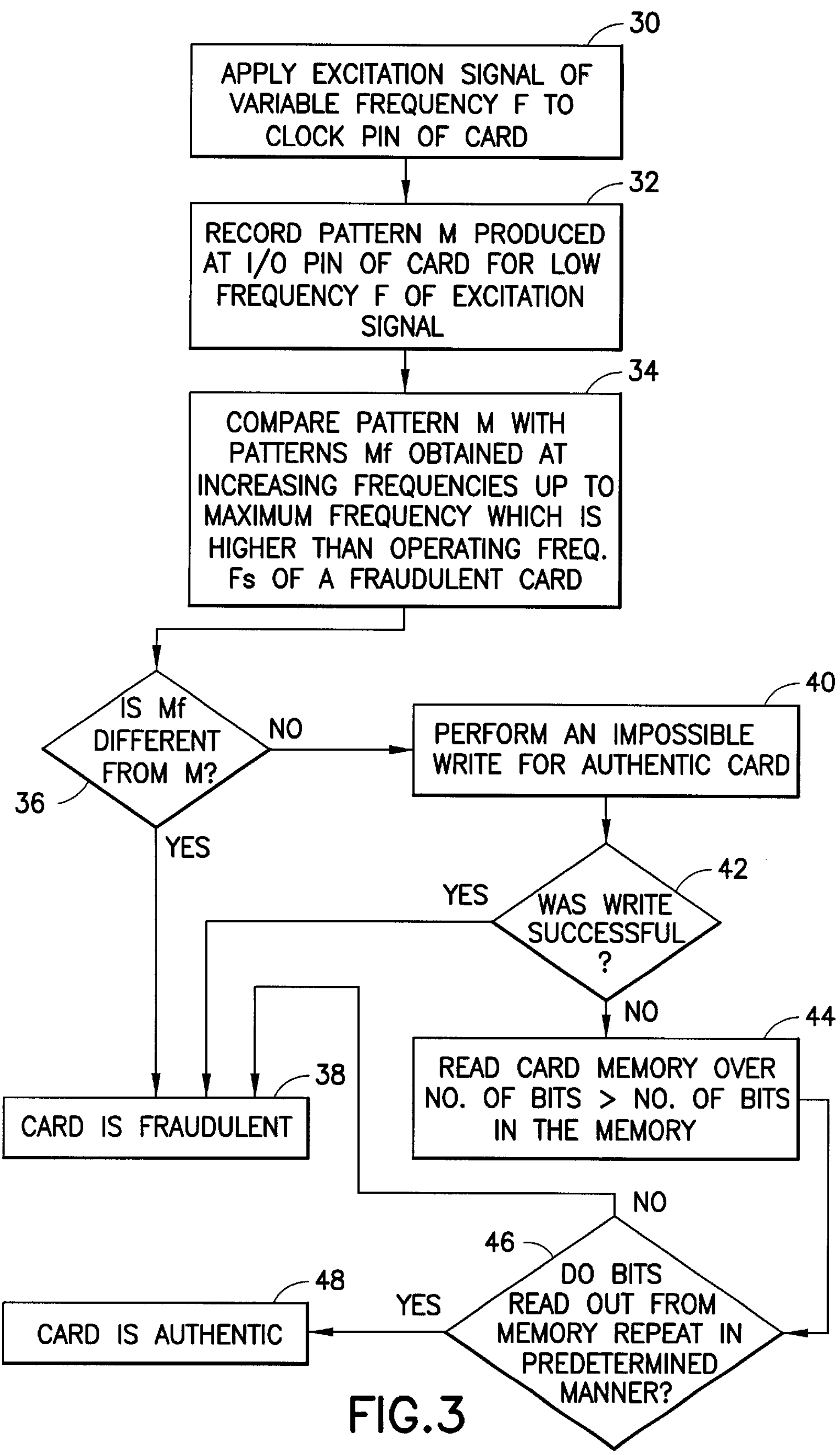
FIG. 3 is a flow chart depicting an implementation of the invention.

The method of the invention for detecting fraud thus applies an excitation signal si of variable frequency F to the clock (CLK) pin of the card, said signal being as shown in FIG. 1*b*. As shown at 30 in the flowchart of FIG. 3, the pattern M produced on the input/output (I/O) pin of the card in response to the excitation signal si at low frequency, i.e. at a normal operating frequency for a microcontroller below its maximum frequency Fs, e.g. 100 kHz, is recorded. FIG. 1*c* shows a possible response pattern M to the FIG. 1*b* excitation signal si, which pattern has a basic sequence of 0-1-1-0-1-0-0-1. Both an authentic card and a fraudulent card return the same pattern at low frequency.

Thereafter, the response pattern is recorded at increasing frequencies in accordance with 32 of the flowchart, to attain a pattern Mf for each frequency. For an authentic card, said response pattern Mf remains identical to pattern M shown in FIG. 1*c* up to frequencies F that may be as high as 250 kHz. In contrast, for fraudulent cards, the response pattern Mf will be subject to distortion around the maximum frequency Fs of about 200 kHz. In practice, it is observed that the above-mentioned basic sequence becomes diluted and the pattern can even be doubled, i.e. 0-0-1-1-1-1-0-0-1-1-0-0-0-0-1-1. A comparison between M and Mf is made, per 34 and 36, to determine whether such distortion has occurred below frequency F0. If so, then at 38 the card is categorized as being fraudulent.

In short, the method of the invention makes it possible to conclude that fraud is taking place when the response pattern of the card becomes distorted at an excitation frequency lower than the operating frequency F0 of an authentic card.

A negative result from the above-described operations can lead to a conclusion only that there is no active simulator present, since, to the pay phone using the measurement pattern, a single-memory passive simulator looks the same as an authentic card.

Thus, in order to be able also to detect the presence of a passive simulator, an additional step 40 is provided. A first implementation of step 40 writes at least one bit under write conditions that are impossible for an authentic card, and then performs a read-back operation. It is determined at 42 whether the read-back is successful. If it is successful, then the card is categorized at 38 as fraudulent.

A first implementation of an impossible write is to attempt to write said bit using a voltage that is lower than the nominal read/write voltage Vpp (a variable supply voltage, or programming voltage, defined in the ISO standard 7816, part 2) for the memory of an authentic card. Most phone cards presently in service require a voltage Vpp that is greater than 5 V. If the passive simulator uses a memory that operates with a voltage Vpp of 5 V, then it is clear that when an attempt is made to write a bit in the memory of the object present in a pay phone using a voltage Vpp of 5 V, and when read-back of said bit is successful, then said object must be fraudulent since the applied voltage Vpp is insufficient for writing a bit in an authentic phone card.

Figure 2:
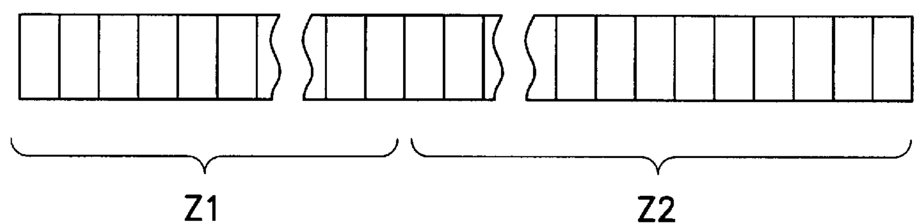
FIG. 2 is a diagram of an electronic memory of a card used in telephony.

A second implementation of an impossible write is to attempt to write said bit in a zone Z1 of the memory in which writing is forbidden in an authentic card, even at the nominal voltage Vpp. As shown in FIG. 2, it is conventional for the memory of a phone card to have a non-modifiable first zone Z1 followed by a zone Z2 in which writing is authorized. Thus, if writing in zone Z1 is successful, it is entirely reasonable to conclude that the card inserted in the pay phone is fraudulent. The invention can use either one or both of these two implementations of an impossible write.

Finally, another additional step performs an operation at 44 of reading the memory over a number of bits that is greater than the number of bits in said memory. Thus, for the memory shown in FIG. 2, it is possible to read back a number of bits that is greater than the number of bits in the zones Z1 and Z2 combined, e.g. a number of bits equal to the number of bits in the sequence Z1+Z2+Z1. An authentic phone card will begin by responding with the bits in Z1 and Z2, and then since its address counter cycles through zero, it will begin responding with the Z1 initial bits again. Beyond the Z1+Z2 initial bits, a simulator will respond in an undetermined manner. Operation 46 determines whether the card responded correctly in the predetermined manner of cycling to the initial bits. If not, then the card is categorized at 38 as a fraudulent card. However, if 46 yields a positive result, then the card is categorized at 48 as being authentic.

What is claimed is:

1. A method of distinguishing an authentic electronic memory card having a given operating frequency from a fraudulent electronic memory card having a maximum operating frequency lower than said given operating frequency, and used in a telephone set, comprising:

applying an input excitation signal of a selected frequency and having a known pattern to an input of a particular electronic memory card to generate an output response pattern;

comparing said output response pattern with said known pattern of the input excitation signal; and identifying said particular electronic memory card as fraudulent when said output response pattern is a deformation of said input excitation signal at a selected frequency that is lower than said given operating frequency.

2. A method according to claim 1, further comprising writing at least one bit in the particular electronic memory card under write conditions that are impossible for an authentic electronic memory card to perform properly, performing a read-back operation on said bit, and determining that said particular electronic memory card is fraudulent if the read-back is successful.

3. A method according to claim 2, wherein said impossible write conditions comprise writing said bit in a memory zone in which writing is authorized for an authentic electronic memory card while using a voltage that is lower than a nominal read/write voltage (Vpp) of an authentic electronic memory card.

4. A method according to claim 2, wherein said impossible write conditions comprise writing said bit using a nominal read/write voltage of an authentic electronic memory card but in a memory zone (Z1) in which writing is forbidden for an authentic electronic memory card.

5. A method according to claim 1, further comprising reading the particular electronic memory card over a number of bits that is greater than the number of bits that can be stored in an authentic electronic memory card.

* * * * *